United States Patent [19]

McGinniss

[11] 3,970,535

[45] July 20, 1976

[54] PHOTOPOLYMERIZATION PROCESS UTILIZING A 2-METHYL-SUBSTITUTED BENZIMIDAZOLE AS A PHOTOSENSITIZER

[75] Inventor: Vincent Daniel McGinniss, Valley City, Ohio

[73] Assignee: SCM Corporation, Cleveland, Ohio

[22] Filed: June 12, 1974

[21] Appl. No.: 478,572

[52] U.S. Cl. .................... 204/159.18; 204/159.19; 204/159.23; 204/159.24; 260/42.28; 260/47 EP; 260/47 UA; 260/77.5 LR; 260/837 R; 427/54; 428/413; 428/461; 526/204; 526/320; 526/328
[51] Int. Cl.[2] ..................... C08F 8/18; C08F 8/34
[58] Field of Search ................. 204/159.23, 159.24, 204/159.14, 159.18, 159.19; 96/115 P

[56] References Cited
UNITED STATES PATENTS

| | | | |
|---|---|---|---|
| 2,773,822 | 12/1956 | Kern | 204/159.24 |
| 3,479,185 | 11/1969 | Chambers, Jr. | 96/84 |
| 3,549,367 | 12/1970 | Chang et al. | 204/159.23 |
| 3,597,343 | 8/1971 | Dalzenne et al. | 204/159.23 |
| 3,622,334 | 11/1971 | Hurley et al. | 96/115 P |
| 3,645,772 | 7/1972 | Jones | 96/86 P |
| 3,782,951 | 1/1974 | Lee | 96/115 P |

*Primary Examiner*—Richard B. Turer
*Attorney, Agent, or Firm*—Merton H. Douthitt; S. I. Khayat

[57] ABSTRACT

U. V. polymerization of a photopolymerizable vehicle is improved by incorporating into the vehicle about 0.5–10% by weight of a 2-methyl substituted benzimidazole.

8 Claims, No Drawings

PHOTOPOLYMERIZATION PROCESS UTILIZING A 2-METHYL-SUBSTITUTED BENZIMIDAZOLE AS A PHOTOSENSITIZER

BACKGROUND OF THE INVENTION

This invention relates to an improvement in process for polymerizing (curing) a photopolymerizable vehicle by exposure of same to U.V. radiation. "Curing" herein connotes polymerization and hardening to obtain a product that is practicaal for ordinary use and normally is tack-free.

The vehicle used herein is the binder for a film in the nature of a coating. The polymerized product is generally a clear one which optionally can be tinted in a variety of colors for the purpose of protecting and/or decorating. For convenience herein the binding vehicle alone for polymerization and such vehicle compounded with other ingredients will be referred to from time to time herein as a "coating". This coating can be a fluent, liquid phase-continuous material or a powdery mixture. It can have, if desired, colorants and fillers, in conjunction with such binding vehicle. Such coating also can have various other conventional additives such as pesticides, odorants, flow-control agents, bubble breakers, defoamers, platicizers, intercoat adhesion-promotors, and other ingredients conventional in surface coating films.

Conventional convection ovens and infrared sources have been used to cure (polymerize) binders in surface coating or decorating films and inks, often with the assistance of a catalyst in such coating deposit. More recently, ultraviolet (U.V.) wave energy curing of such binders (vehicles) have been suggested using suitable U.V. sensitizers for initiating photopolymerization at wave lengths in the U.V. spectrum that are transmittable through a quartz or other transparent window, generally such range understood as lying between about 1600 A and about 4200 A.

Typical U.V. emitters for such curing include the known low to high pressure mercury lamps which are known and well described in the art of photochemistry. Of significance is the U.V. source known as the swirl-flow plasma arc radiation source described in U.S. Pat. No. 3,364,387. This plasma arc source provides a continuum radiation of high intensity, generally at least 350 watts to about 5000 watts per square centimeter steradian (about 1000 kilowatts to 15000 kilowatts per square foot of projected area). The wavelength of the radiation emitted by the foregoing plasma arc source is predominantly longer than 4000 A (about 70%) with the remainder (about 30%) being less than 4000 A in length. Other radiation sources can be used, such as, for example, lasers having a lasing output in the U.V. spectrum range as described in copending patent application Ser. No. 189,254, to de Souza and Buhovecky and assigned to the same assignee as the present invention. The subject matter of U.S. Pat. No. 3,364,387 and application Ser. No. 189,254 are incorporated herein by reference.

Advantages of the instant invention over prior proposals include especially economical and efficient utilization of U.V. energy, particularly that in wave lengths between about 3200 A and 4200 A to perform "cold" polymerization (curing of the vehicle at quite high speed) with attendant suppression of losses due to volatilization of the coatings' components, suppression of discoloration or degradation of the resulting deposit (which can be generally considered a film), and avoidance of shrinkage and distortion (the preservation of dimensional stability), and suppression of degradation of the substrate to which the vehicle is applied, particularly when such substrate is a plastic, or paper, or fabric.

SUMMARY OF THE INVENTION

The instant invention is an improvement in process for polymerizing a U.V. photopolymerizable vehicle by exposure to U.V. radiation. The improvement comprises incorporating into said vehicle about 0.2–10.0% by weight (and advantageously about 0.5–2% by weight (of the vehicle) of a substituted 2-methyl, benzimidazole as demonstrated by the following:

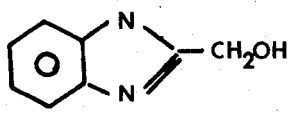

2- benzimidazolemethanol

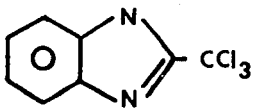

2-(trichloromethyl) benzimidazole

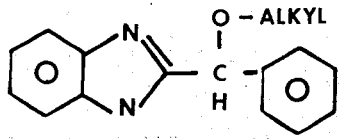

2 (α-hydroxybenzyl)-benzimidazole alkyl ether

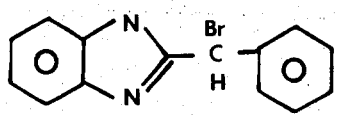

2( bromobenzyl ) benzimidazole

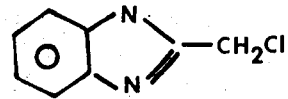

2-chloromethylbenzimidazole

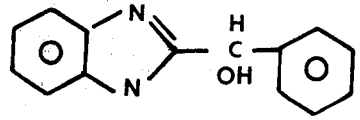

2- (α-hydroxybenzyl)-benzimidazole

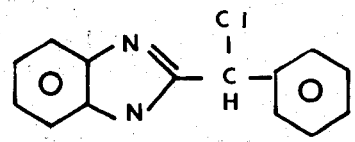

2(Chlorobenzyl) benzimidazole

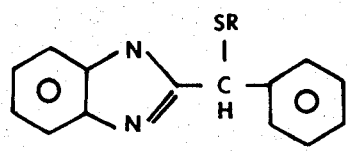

2 (α-thiobenzyl) benzimidazole
where R = H, alkyl or aryl radical

Frequently, the needed proportion of the substituted benzimidazole sensitizer also can be incorporated directly into the vehicle as a unit of a further polymerizable monomer, oligomer, prepolymer, or polymer vehicle. In such instance, for example, the substituted benzimidazole compound has a reactable function group on it such as a carboxyl group or a hydroxyl group. Typically, then, such substituted benzimidazole compound can be made to react with a further polymerizable material, e.g., glycidyl acrylate, either in monomeric form or already part of a preformed prepolymer or oligomer.

Typically, the vehicles can constitute the entire deposit or a binder for solids to yield a cured product in the nature of a coating. Usually the vehicles are fluid at ordinary operation temperature (between about 30°F. and about 300°F. and advantageously between ordinary room temperature and about 180°F.)., and when polymerized by the U.V. radiation, give a tack-free film or deposit that is durable enough for ordinary handling. In the cured state such vehicle is resinous or polymeric in nature, usually cross-linked. Uncured for applicaation to a substrate or uncured on such substrate, such vehicle consists essentially of a monomer or mixture of monomers, or a further polymerizable oligomer, prepolymer, resin, or mixture of same, or a resinous material dispersed or dissolved in a solvent that is copolymerizable therewith. Such solvent ordinarily is monomeric, but can be an oligomer (i.e. up to 4 monomer units connected) or prepolymer (mol weight rarely above about 2000). Oligomers and prepolymers should be understood herein as being polymeric in nature.

In the main such vehicles or binders are those which also are conventionly polymerizable by free radical-induced addition polymerization using peroxy, or azo catalysis, or a redox system. Alternatively, however, the binders can be a fluent material wherein the ultraviolet wave energy causes photochemical generation of a catalytic material or effects a rearrangement which starts a polymerization that continues until a usefully polymerized deposit results. The useful vehicles can be polymeric, monomeric, or a mixture, especially those exhibiting polymerizable vinyl, acrylic, allylic, mercaptan, fumaric, maleic, or like unsaturated functionality. Reactive polymeric types include unsaturated polyesters, acrylics, epoxies, urethanes, and silicones. Representative polymeric vehicles include those derived from the reaction of dibasic acids or their anhydrides with polyols. For example, equimolar amounts of maleic anhydride and phthalic anhydride can be reacted with propylene glycol in slight excess to form an unsaturated polyester which can be extended with styrene to a pre-selected value of non-volatiles (n.v.)., generally between 50 and 80% n.v. The polyester resin thus prepared has an acid number of about 60 and less. Of course, fumaric acid can be substituted easily for the maleic anhydride. Similarly, propylene oxide can be substituted for the major portion of propylene glycol. Also instead of styrene other active monomers such as hydroxyethyl-acrylate can be used, usually up to about 50% by weight.

As to acrylic and other polymers, they are trimethylolpropane triacrylate, pentaerythritol triacrylate, ethyleneglycol diacrylate, diacrylic acid adduct of the diglycidyl ether of bisphenol A (DER 332 diacrylate), a di- or tri-isocyanate reacted with a hydroxy containing acrylate such as hydroxyethyl or hydroxypropyl acrylate.

Reactive monomer types include a variety of acrylates such as hydroxyethyl, cyclohexyl, hydroxypropyl, 2-ethylhexyl, benzyl, phenoxyethoxy, lower alkoxyethoxy, tetrahydrofurfuryl, similar acrylates, and also N-vinyl pyrrolidone, vinyl acetate, vinyl acetate-butyrate, styrene and substituted styrenes.

The substituted benzimizidazole sensitizers are useful by themselves or in admixture with other conventional sensitizers such as benzoin, benzoin ethers, oxime ethers, and phosphines. Additionally, to enhance cure throughout the vehicle when the vehicle temperature is substantially above about 100°F. and such vehicle is partially susceptible to such catalysis, a minute proportion of a peroxy or like free-radical catalyst can be used.

Not only is the speed of U.V. curing quite good using the present substituted benzimidazoles but also the depth of cure is quite practical so that the resultant polymerized deposit resists scratching or disruption when first ostensibly "dry" on the surface. Curing can continue on stored pieces. Typical film thickness for the deposit can be about 0.1 to as high as 10 mils or even substantially higher, e.g., 30–50 mils. Preferred cured deposits are continuous films, but decorative or message-transmitting ones need not be.

Typically, the substrate workpieces coated with the uncured deposit or deposits are passed under a U.V.-providing light beam by a conveyor. The substrate being coated can be metal, mineral, glass, wood, paper, plastic, fabric, ceramic, etc.

Many useful pigments can be incorporated, in very modest proportions, in the vehicle without much deleterious effects. Thus, opacifying pigments such as zinc oxide can be used quite well. Titania, e.g., anatase and particularly rutile, makes for a much more difficult film to cure by U.V. radiation, but such opacifying pigmentation can be used successfully only to the extent of about 20% by weight of the total pigmented composition. Other filler materials and coloring pigments such as basic lead sulfate, magnesium silicate, silica, clays, wollastonite, talcs, mica, chromates, iron pigments, wood flour, microballons, hard polymer particles, and even reinforcing glass fiber or flake also can be used in the vehicle to make some special coatings. Ordinarily it is most desirable to use pigments which do not absorb a great deal of U.V. wavelength in the same region of the U.V. spectrum as is absorbed by the substituted benzimidazole sensitizers.

The wave length of the U.V. source should not be too similar to or close to the wavelength absorbed by the pigment in the U.V. range for best advantage of the irradiation process. Pigmented or filled films for the process preferably are no more than about a mil thick and generally about 0.1–0.5 mil thick, maximum, for efficiency and economy of curing.

Where it is desirable to induce fusion or flow in a "wet" (uncured) coating deposit such as a powder, followed by a polymerizing cure of the type available by use of the instant improvement, it can be advantageous to first warm the deposit or substrate by a conventional method; e.g., forced or natural convection, electrical induction, or with source of infrared energy, then follow this with the U.V. radiation for cure.

The following examples show ways in which this invention has been practiced, but should not be construed as limiting it. Unless otherwise specifically stated herein, all parts are parts by weight, all percentages are weight percentages, and all temperatures are in degrees Fahrenheit. Where the binder being cured is of the type normally curable by free-radical polymerization, it is sometimes advantageous for completeness of cure and speed to maintain a substantially inert atmosphere above the irradiated workpiece; e.g., by a purge of nitrogen or other inert gas, but this is not required in all situations.

EXAMPLE 1

A "clear" coating of 1/3 part melamine acrylate, 1/3 part hydroxyethyl acrylate, and 1/3 part of the adduct described below was the vehicle for test curing using a plasma arc radiation unit. The special adduct is the reaction product of one mole of isophorone diisocyanate and 2 moles of hydroxyethyl acrylate.

The curing apparatus is an intense radiation torch (plasma arc) optically directed by a reflector system to irradiate a freshly painted flat aluminum workpiece passing below a rectangular irradiating window on an enclosed horizontal conveyor moving at various line speeds (providing about 0.2 seconds of irradiation at 100 feet a minute and 0.1 second of irradiation at 200 feet a minute). The atmosphere around the workpiece during its irradiation is kept essentially inert by purging it with nitrogen. Radiation energy supplied by such apparatus to the workpiece surface is about 35 kilowatts per square foot with slightly less than about 6 kilowatts per square foot thereof being in the U.V. spectrum. Such sort of torch is described in U.S. Pat. No. 3,364,387.

The above "clear" coating was applied to an aluminum workpiece (4 × 8 inch size panel) as a film of about 0.4 mil thicknss utilizing a wound wire rod No. 8. The coated panel was subjected to the radiation emitted by the apparatus described but the film did not cure completely even when exposure at line speed of 100 feet per minute was continued for 150 times (Total actual exposure time in 30 seconds). Incomplete cure of the film is recognized by being tacky to the touch.

The vehicle was dosed with 2% by weight of 2-chloromethylbenzimidazole well mixed in. The sensitized coating was spread at about 0.4 mil thick on the aluminum test panel and was cured at room temperature by subjecting it to the apparatus as above described. At 100–200 feet per minute line speed the vehicle cured tack-free and had a good scratch resistance to the fingernail, indicating good cure throughout the film depth.

EXAMPLE 2

In this Example the same apparatus, operation, and vehicle of Example 1 were used, except that the photosensitizer was replaced with 2-(trichloromethyl) benzimidazole. The results of complete cure at line speeds of 100 to 200 feet per minute were obtained also.

EXAMPLE 3

In this Example the same apparatus, operation, and vehicle of Example 1 were used, except that 2% of 2-(α-chlorobenzyl) was used. Again, the same results as Examples 1 and 2 were obtained.

EXAMPLE 4

In this Example, the same apparatus, operation, and vehicle of Example 1 were used except for the sensitizer. In this case I used 2% by weight of 2-(α-hydroxybenzyl)-benzimidazole and the cure speed was 100 ft/min. or an exposure of 0.2 second to obtain full cure.

EXAMPLE 5

Same as Example 1 but I used 3% of 2-(α-mercaptobenzyl)-benzimidazole and the cure speed was 100 ft/min. (0.2 sec. exposure).

EXAMPLE 6

Same as Example 1 but I used 3% of 2-benzimidazolemethanol and the cure speed was 100 ft/min. (0.2 sec. exposure).

EXAMPLE 7

A "clear" vehicle was prepared from 1/3 part pentaerythritol triacrylate, 1/3 part hydroxyethyl acrylate, and 1/3 the adduct formed by reacting one mole of toluenediisocyanate with 2 moles of hydroxyethyl acrylate.

The curing procedure was carried out in the same manner described in Example 1. Without the incorporation of any sensitizers no curing (hardening) of the coated film (0.5 mil) was observed even with repeated exposures to the U.V. source. (Panels coated with the "clear" vehicle to about 0.5 mil thickness were passed under the U.V. radiation source at line speeds of 100 feet per minute for 100 consecutive times without any observable curing).

The described substituted benzimidazoles of Examples 1–6, inclusive were each incorporated into the clear vehicle to the extent of 2% by weight. The dosed vehicles were applied to aluminum panels in films of about 0.5 mil thick. The coated panels were then passed under the U.V. radiation source at a line speed of 100 feet per minute (exposure time is 0.2 sec.). Films were found to be cured completely and throughout.

EXAMPLE 8

A "clear" vehicle was prepared from 1/2 tri-methylolpropane and 1/2 2-ethylhexyacrylate and divided into three equal portions. In each portion one known sensitizer (2%) was incorporated. These known sensitizers were bromomethylbenzophenone, p-toluenesulfonyl chloride, and benzenesulfonyl chloride. The vehicle without any sensitizer and the sensitized vehicles were applied to panels and irradiated in the same manner described in Example 1. The vehicle by itself did not appear to cure with repeated exposures at line speed of 100 feet per minute. The dosed vehicles, however, showed some limited curing after one exposure but was still greasy in appearance and tacky to the touch. Only after several consecutive exposures at the same line speed did curing improve. The conclusion was that bromomethyl benzophenone, benzene, and toluene sulfonyl chlorides would not be adequate as sensitizers.

EXAMPLE 9

To the same vehicle of Example 8 there were added 2% by weight of 2-chloromethylbenzimidazole. Treated in the manner described in Example 1, the film showed complete and hard cure in one exposure at line speed of 200 feet per minute.

EXAMPLE 10

Instead of the 2-chloromethyl-benzimidazole of Example 9, 2% by weight of 2-(tri-chloromethyl) benzimidazole was used with substantially the same results.

EXAMPLE 11

Instead of the 2-chloromethyl-benzimidazole of Example 9, 2% by weight of 2-(α-bromobenzyl) benzimidazole with substantially the same results.

EXAMPLE 12

An ink composition was prepared as follows: an acrylate bis phenol A epoxy resin (65 parts), 2-bromomethylbenzimidazole (6 parts), Lithol Rubine red pigment (17 parts), was (7.0 parts) and tridecyl alcohol (5 parts). The ink was applied onto paper and exposed to the apparatus described in Example 1 at line speed of 100 ft/min. The ink cured completely with no apparent wetness or smudges.

EXAMPLE 13

A sample of the vehicle described in Example 1 was divided in four equal portions marked A, B, C, and D. In portion A there was incorporated 2% by weight of naphthalene sulfonyl chloride; into portion B, 2% by weight of α-chloromethyl naphthalene; into portion C a 2% by weight of a 50/50 mixture of a naphthalene sulfonyl chloride and α-chloromethylnaphthalene; and into portion D a 2% by weight of 2-chloromethylbenzimidazole. The dosed portions were passed under the U.V. source described in Example 1 at line speeds of 200 ft/min. The results were that the sensitized portions A, B, and C showed incomplete cure with observable tackiness at the substrate. Sensitized portion D was, however, completely and fully cured throughout and particularly at the substrate.

What is claimed:
1. In a process for photopolymerizing a polymerizable ethylenically unsaturated vehicle, wherein said vehicle is photosensitized by incorporating thereinto a photosensitizer and exposing the photosensitized vehicle to a source of ultraviolet radiation, the improvement which comprises incorporating as a photosensitizer into said vehicle a substituted 2-methyl benzimidazole compound wherein the substituent is attached to the 2-methyl carbon, said photosensitizer is the amount of about 0.5 to about 10% by weight, based on the weight of the vehicle.
2. The process according to claim 1 wherein said substituted benzimidazole is 2-chloromethyl benzimidazole.
3. The process according to claim 1 wherein said substituted benzimidazole is 2-(trichloromethyl)-benzimidazole.
4. The process according to claim 1 wherein said substituted benzimidazole is 2(α-hydroxybenzyl benzimidazole.
5. The process according to claim 1 wherein said substituted benzimidazole is 2(α-hydroxybenzyl)-benzimidazole alkyl ether.
6. The process according to claim 1 wherein said substituted benzimidazole is 2(chlorobenzyl)-benzimidazole.
7. The process according to claim 1 wherein said substituted benzimidazole is 2(bromobenzyl)-benzimidazole.
8. The process according to claim 1 wherein said substituted benzimidazole is 2(α-thiobenZYl)-benzimidazole.

* * * * *